July 16, 1963 S. E. MITCHELL 3,098,183
CAPACITY DISPLACEMENT TRANSDUCER
Filed July 21, 1960
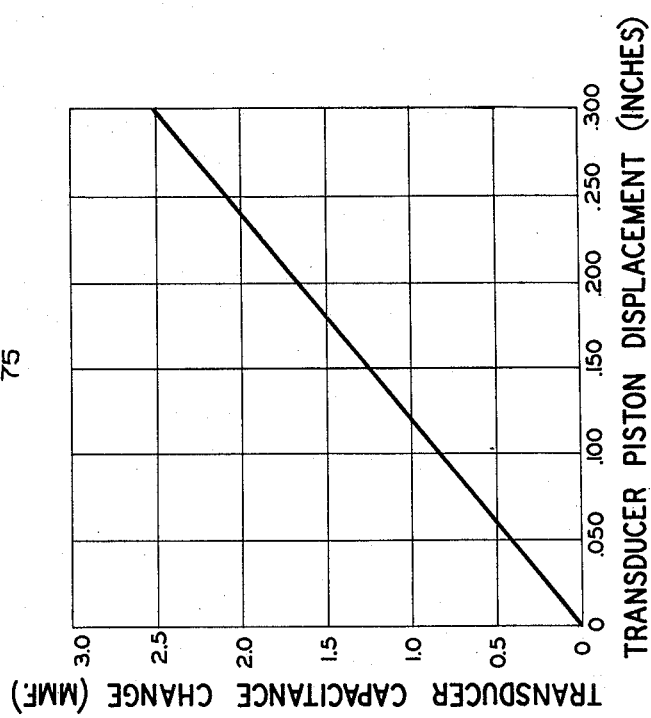
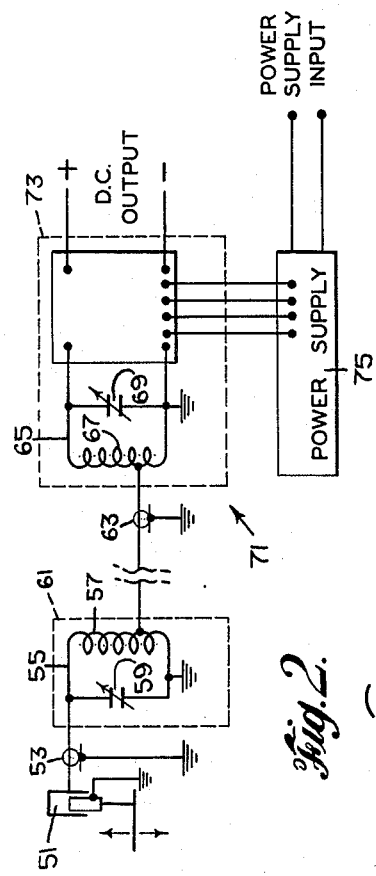
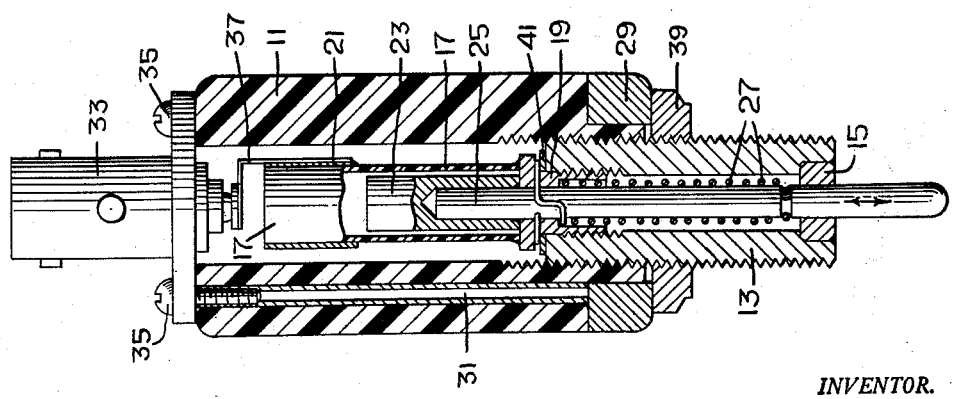
INVENTOR.
SAMUEL E. MITCHELL
BY
Howard K. Kothe
ATTORNEY

United States Patent Office 3,098,183
Patented July 16, 1963

3,098,183
CAPACITY DISPLACEMENT TRANSDUCER
Samuel E. Mitchell, Dunbar, W. Va., assignor to Union Carbide Corporation, a corporation of New York
Filed July 21, 1960, Ser. No. 44,350
1 Claim. (Cl. 317—246)

The present invention relates to an electrical transducer and, more particularly, to a continuously variable capacitance transducer which employs a resiliently supporting shaft member to translate reciprocal motion into electrical capacitive reactance values, enabling precise electrical detection of minute physical changes.

The apparatus is particularly useful in surface contour measuring, accurate travel control of moving apparatus, precision cam setting, electronic micrometry and similar engineering and scientific work.

The invention also comprises novel details of construction and novel combinations of components, together with other features and results which will be more apparent from the following description. The drawings merely show and the description merely describes a preferred embodiment of the present invention which is given by way of illustration.

In the drawings:

FIGURE 1 is a partially sectional view showing the components of a variable capacitance embodiment of the present invention;

FIGURE 2 is a typical schematic diagrammatic arrangement of the apparatus of the present invention in combination with electronic detecting apparatus and FIGURE 3 is a graph of a typical capacitance versus electrode displacement characteristic of an embodiment of the present invention similar to that shown in FIGURE 1.

In the embodiment of the drawings and with particular reference to FIGURE 1, there is provided an outer housing 11 of hollow cylindrical form with both ends open, made from any suitable dielectric material, such as phenol formaldehyde resin, porcelain or the like. The interior of housing 11 is threaded from one end of said housing for somewhat less than one-half its length, to accommodate bearing and spring holder 13, which is an open-ended hollow cylinder fabricated from electrically conductive material, with a full exterior thread and a partial interior thread extending from one end thereof. At the end opposite the interiorly threaded end, the bore of bearing and spring holder 13 is enlarged to accommodate sleeve bearing 15 which is made of bronze or other suitable bearing material and press fitted into bearing and spring holder 13.

A condenser stator assembly for the embodiment of the present invention shown in FIGURE 1 of the drawings comprises a relatively thin-walled open-ended hollow dielectric cylinder 17 of quartz or other suitable dielectric material, fitted at one end with an electrically conductive threaded ferrule 19, and at the other end with a peripherally arranged electrically conductive exterior sleeve extending for somewhat less than one-half the length of said dielectric cylinder to form a stationary electrode 21. Ferrule 19 has an exterior thread to engage the interiorly threaded end of bearing and spring holder 13, is provided with at least one longitudinal slot of sufficient width to pass a turn of coil spring 27, and has an axial bore which is diametrically enlarged at the threaded end of the ferrule.

The moveable portion of the transducer as embodied in FIGURE 1 of the drawings is an assembly comprising piston electrode 23, actuating shaft 25 and coil spring 27, all of electrically conductive material. Piston electrode 23 is provided with an axial bore at one end to accommodate one end of actuating shaft 25, which is rigidly affixed thereto. Actuating shaft 25 is provided with a circumferential groove to accommodate a small diameter end turn of coil spring 27 which may be permanently attached thereto by soldering or similar means.

Electrically conductive grounding ring 29 is arranged in an outer circumferential recess at the interiorly threaded end of housing 11. Grounding tube 31 fits slideably in a longitudinal bore in the annular side wall of housing 11 and is soldered or otherwise attached to grounding ring 29, thus preventing grounding ring rotational movement and providing ground path continuity through housing 11.

Coaxial cable connector 33 is secured to housing 11 at the end opposite the grounding ring end by means of connector retaining screws 35, one of which serves as a grounding connector by being screwed into a tapped end portion of grounding tube 31.

Leaf spring contactor 37 is soldered or similarly affixed to stationary electrode 21 and arranged to make electrical contact to the center or ungrounded pole of coaxial cable connector 33.

Locking nut 39 is provided to hold the main components of the apparatus in place in housing 11 and also serves as a grounding connector between bearing and spring holder 13 and grounding ring 29. Lockwasher 41 is installed between the shoulder portion of threaded ferrule 19 and the interiorly threaded end of bearing and spring holder 13 and serves to make a firm screwed connection and to hold the end of coil spring 27 firmly grounded.

To assemble the above described components, grounding tube 31 is brazed or soldered to grounding ring 29 and both are positioned in housing 11. Coaxial cable connector 33 is secured to the end opposite the interiorly threaded end of housing 11 by retaining screws 35, one of which engages the tapped end of grounding tube 31. Moveable piston electrode 23 is soldered or otherwise secured to actuating shaft 25 and these assembled units are introduced, shaft end first, into the stationary electrode end of dielectric cylinder 17 with actuating shaft 25 extending through the bore of threaded ferrule 19. Coil spring 27 is then slipped over actuating shaft 25 and arranged in the enlarged bore portion of threaded ferrule 19 with a last turn of said spring extending through the longitudinal slot in said ferrule. The end turn opposite the threaded ferrule end of coil spring 27 is snapped into the circumferential groove of actuating shaft 25 and may be soft soldered to said shaft at that point. Lockwasher 41 is slipped over the shaft 25, spring 27 and threaded portion of ferrule 19 and the two-electrode assembly is introduced, shaft end first, into the interiorly threaded end of bearing and spring holder 13, shaft 25 extending through sleeve bearing 15 at the end opposite the interiorly threaded end of said bearing and spring holder, and threaded ferrule 19 is screwed into the bearing and spring holder. Leaf spring 37 is affixed to stationary electrode 21 by soldering or the like.

Bearing and spring holder 13, with the condenser stator portion and moveable portion of the transducer thus attached, is screwed, leaf spring end first, into the interiorly threaded end of housing 11 until leaf spring 37 contacts the center pole of coaxial cable connector 33. The relative positions of the assembled component parts are maintained by locking nut 39, which is screwed onto the exterior thread of bearing and spring housing 13 and bears against grounding ring 39.

Thus assembled and as shown in FIGURE 1 of the drawings, the apparatus of the present invention comprises a continuously variable capacitor having one resiliently suspended reciprocally moveable electrode. Any displacement motion of actuating shaft 25 produces an identical movement of piston electrode 23, effecting a capacitance change between stationary electrode 21 and moveable piston electrode 23. One electrically continuous path is provided from stationary electrode 21 through leaf spring 37 to the center pole of coaxial cable connector 33 and a second electrically continuous path is provided from moveable piston electrode 23 through actuating shaft 25, coil spring 27, threaded ferrule 19, lockwasher 41, bearing and spring holder 13, locking nut 39, grounding ring 29, grounding tube 31, a retaining screw 35, and the outer housing portion of coaxial cable connector 33. Coaxial cable, with a grounded outer conductor contacting the outer housing and with center conductor contacting the center pole of coaxial cable connector 33, may be used to provide lead-in conductors to any circuit in which the transducer is to be employed as a circuit element.

In a specific example of the embodiment above described and illustrated in FIGURE 1 of the drawings, a transducer was fabricated to yield a 2.50 micromicrofarad capacitance change for a 0.300 inch movement of actuating shaft 25. The relationship was found to be substantially linear and is illustrated in FIGURE 3 which shows capacitance change as ordinate values plotted versus moveable piston electrode displacement as abscissa values on a rectilinear coordinate graph. Any measuring system which converts capacitance changes into sensible electrical signals may be used with the present invention.

FIGURE 2 of the drawings is a schematic-diagrammatic illustration of a typical arrangement of detection equipment of the type described in U.S. Patent No. 2,831,166 to Rogers et al. in combination with a transducer of the present invention having the characteristics illustrated in FIGURE 3. In FIGURE 2, transducer 51 is connected to a first radio frequency tank circuit 55 by a first length of coaxial cable 53. First radio frequency tank circuit 55 comprises first coil 57 in parallel with first variable capacitor 59 enclosed in a suitable first housing 61 which may be located adjacent to transducer 51. A second length of coaxial cable 63 provides link coupling between first tank circuit 55 and a second tank circuit 65 which comprises second radio frequency coil 67 in parallel with second variable capacitor 69 and which is the oscillator tank portion of an oscillator and detector arrangement indicated generally by designation 71. Oscillator and detector 71, including second radio frequency tank circuit 65 are enclosed in a suitable second housing 73. A power supply for the components of FIGURE 2 is shown generally as designation 75.

With the several circuit elements arranged and connected as shown in FIGURE 2 of the drawings, the radio frequency tank circuits are tuned to resonance at 7.005 megacycles per second by means of variable capacitors 59 and 69. Displacement of actuating shaft 25 by the physical movement to be monitored causes a change in the effective capacitance of first tank circuit 55, detuning said circuit from the selected resonance point. Through the link coupling provided by second coaxial cable 63 connected between the respective coils 57 and 67 of tank circuits 55 and 65, an impedance change, corresponding to the extent to which tank circuit 55 is detuned by the capacitance change in transducer 51, is reflected in tank circuit 65. This impedance variation in tank circuit 65 effectively increases or decreases the amplitude of the voltage across the oscillator tank circuit. The varying voltage across tank circuit 65 is rectified by the detector portion of oscillator and detector 71 and the detector output is a varying D.C. voltage, which, in the embodiment herein described and shown in FIGURE 2 of the drawings, comprehends a range of from 0 to 26 volts for a transducer piston displacement of from 0 to 0.300 inch. The D.C. output voltage may be connected to any suitable indicator, recorder or control device.

The foregoing example is illustrative of but one means in which the apparatus of the present invention can be utilized. Alternate methods for the employment of the instant invention will readily suggest themselves to those skilled in the art.

What is claimed is:

A continuously variable capacitance electrical circuit element comprising, in combination, an electrically nonconductive housing having a cylindrical cavity extending concentrically longitudinally therethrough and a bore extending longitudinally therethrough parallel to said cylindrical cavity; a coaxial cable connector affixed to one end of said housing and defining a first end closure for said cavity; an electrically conductive ferrule affixed to the other end of said housing and defining a second end closure for said cavity; grounding ring means adjacent said ferrule and in electrical connection therewith; electrical connection means extending through the bore in the housing and connecting the grounding ring means with one pole of said coaxial cable connector; a hollow cylindrical first electrode arranged within the cavity in said housing and electrically connected to the other pole of the coaxial cable connector; a cylindrical second electrode arranged concentrically in radially spaced relationship with respect to said hollow cylindrical first electrode and adapted to move reciprocally along a longitudinally extending concentric axis common to both said electrodes; an actuating stem affixed to said second electrode and extending therefrom through said ferrule to a point accessible to external mechanical stimuli; and electrically conductive resilient means mechanically and electrically connecting said second electrode and said actuating stem to said ferrule.

References Cited in the file of this patent
UNITED STATES PATENTS 2,512,879     Roggenstein _____ June 27, 1950